P. H. CARMACK.
WHEEL GUARD.
APPLICATION FILED JULY 14, 1921.
1,411,840.
Patented Apr. 4, 1922.
2 SHEETS—SHEET 1.
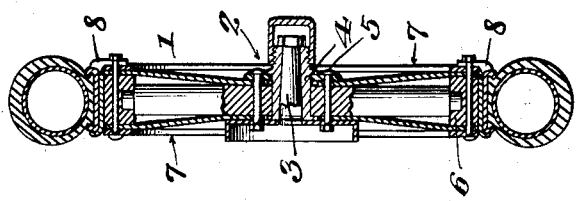
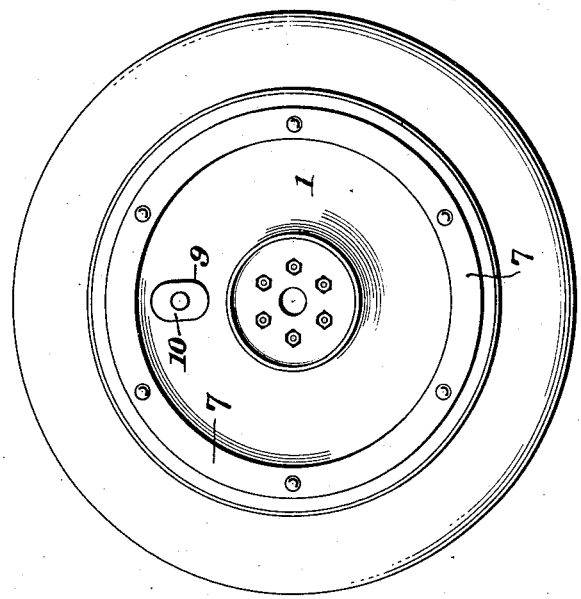
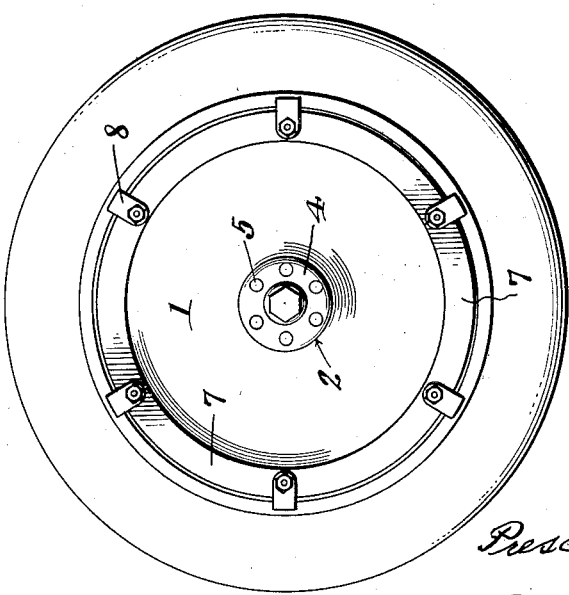
Inventor
Prescott H. Carmack
By
C. F. Belt
Attorney P. H. CARMACK.
WHEEL GUARD.
APPLICATION FILED JULY 14, 1921.
1,411,840.
Patented Apr. 4, 1922.
2 SHEETS—SHEET 2.
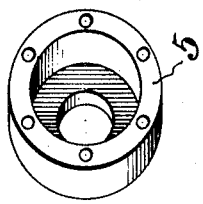
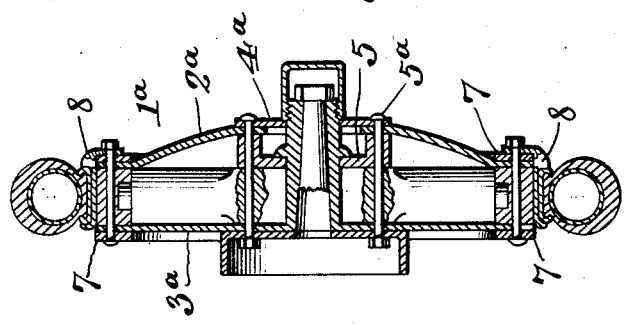
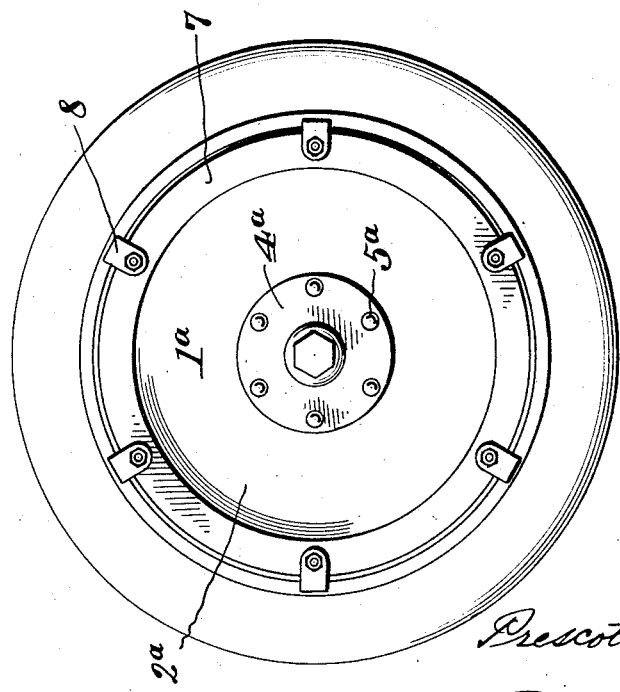
Inventor
Prescott H. Carmack
By
C. F. Bell
Attorney

UNITED STATES PATENT OFFICE.

PRESCOTT H. CARMACK, OF CHICO, CALIFORNIA.

WHEEL GUARD.

1,411,840. Specification of Letters Patent. Patented Apr. 4, 1922.

Application filed July 14, 1921. Serial No. 484,632.

*To all whom it may concern:*

Be it known that I, PRESCOTT H. CAR-MACK, a citizen of the United States, residing at Chico, in the county of Butler and State of California, have invented certain new and useful Improvements in Wheel Guards, of which the following is a specification.

This invention relates to improvements in attachments or appliances particularly adapted for wheels of the automobile type, which may be termed mud or weather guards or shields.

The invention has for its object, among other purposes, to protect or guard the wheel from the action of the weather, therefore freeing it from the expanding and deteriorating action which it would be subjected to by exposure to dampness and the action of the sun accordingly exempting it from the resultant shrinkage of the wheel-parts, especially where the latter embrace wooden elements as is quite common.

Further objects of the invention are to provide for affording protection, in the particulars indicated, for both the inner and outer sides of the wheel and without making any material or appreciable difference in weight and whereby greatly increased advantages will accrue.

Still further objects had in view are to provide for carrying out the aforesaid ends or purposes in a simple, effective and inexpensive manner, and with facility.

Other objects of the invention will be made apparent from the following description of the construction, arrangement and operation thereof.

The invention consists therefore of certain instrumentalities and features of construction substantially as hereinafter more fully disclosed and pointed out by the appended claims.

The accompanying drawings illustrate the preferred embodiment, or one form, of my invention wherein it will be understood that various changes and modifications as relate to the detailed construction and arrangement of parts may be made without departing from the spirit or scope thereof as covered by the claims, and in which drawings—

Fig. 1 represents an outside view of a wheel of the automobile-type embodying my invention in mutilation.

Fig. 2 is an inside view thereof.

Fig. 3 is a transverse sectional view of the same also mutilated.

Fig. 4 is a transverse sectional elevation of a modification of my invention.

Fig. 5 is a detail vertical section thereof.

Figs. 6 and 7 are additional detail views thereof.

As characteristic features of my invention, I provide a plate 1 preferably in disc form and of light or sheet metal, preferably brass, the disc or shield being plane or slightly dished or concaved and centrally orificed or cut out as at 2 to provide for the suitable passage of the wheel-axle 3, said disc or shield being rigidly secured to the hub-disc or plate 4, preferably by the hub-plate bolts 5 which are passed therethrough. The disc or shield 1 is adapted to fit against the wheel-felloe 6 at its outer or peripheral portion, and through it, the disc, is inserted the rim-bolts and over said disc-peripheral portion is applied a felloe-ring 7 of slightly heavier material than said disc and rim to retain the disc, at the rim, air-tight, as well as water-proof, this also aiding greatly the appearance of said disc. The felloe-ring is adapted to fit the disc or shield at the wheel-rim, and is held in place by the rim attaching bolts and inward extensions of the felloe laterally engaging the ring. The valve-opening 9 is suitably closed by a shutter-type of closure 10 absolutely water-tight.

It will be obvious from the foregoing that my invention is applicable for both that type of automobile wheels having wooden spokes and those having steel spokes.

In the modification of my invention, as disclosed by Figs. 4, 5, 6 and 7, I may employ in lieu of the foregoing arrangement of parts, a shield or guard as 7ª, with an outer member or disc 2ª of convex contour and an inner plane member 3ª, the same being integral or a single casting, with the peripheral portion, being adapted, as in the form aforesaid, to be suitably secured in position by the wheel-rim bolts, either for a wooden or steel spoked type of wheel. This type of disc or shield is free or independent of the hub-plate 4ª but has both its plane or inner member 3ª and outer convex member 2ª bolted to a separate or special form of hub-plate or disc 5 as at 5ª, also to the hub-plate, 4ª, thus adapted to revolve with the wheel and guard both the inside and the outside of the wheel as is obvious. Thus, as previously indicated, is adapted to serve for shielding or excluding all the wheel parts practically from the action of the weather and the sun, as well as serving as a mudguard. Both of the above described forms or types of discs or shields are adapted to fit on the standard rim parts of wooden spoked or steel spoked wheels, as now manufactured; it is also observed that the shields or discs being of light weight material, although provided upon both sides of the wooden spoked or steel spoked wheel do not add any appreciable weight thereto, yet at the same time give the disc-wheel appearance and also eliminate the changing or carrying of an extra wheel, while also providing for the easy riding qualities of a wooden wheel which the ordinary disc wheel does not have. Numerous other advantages and benefits could be recited in behalf of my invention but these will be more readily appreciated from the same in practical use.

Having thus described my invention what I claim as new and desire to secure by Letters Patent is:—

A wheel-shield comprising outer and inner disk-members, one being curved centrally outward in concave-convex contour, and a cylindrical member having an annular flange adapted to effect the spacing of the centrally curved disk-member from the wheel spokes, and fastening bolts passing through said annular flange and said disk-members.

In witness whereof I hereunto set my hand in the presence of two witnesses.

PRESCOTT H. CARMACK.

Witnesses:
HELEN J. CURTIS,
HENRY DALY.